Figure 1:
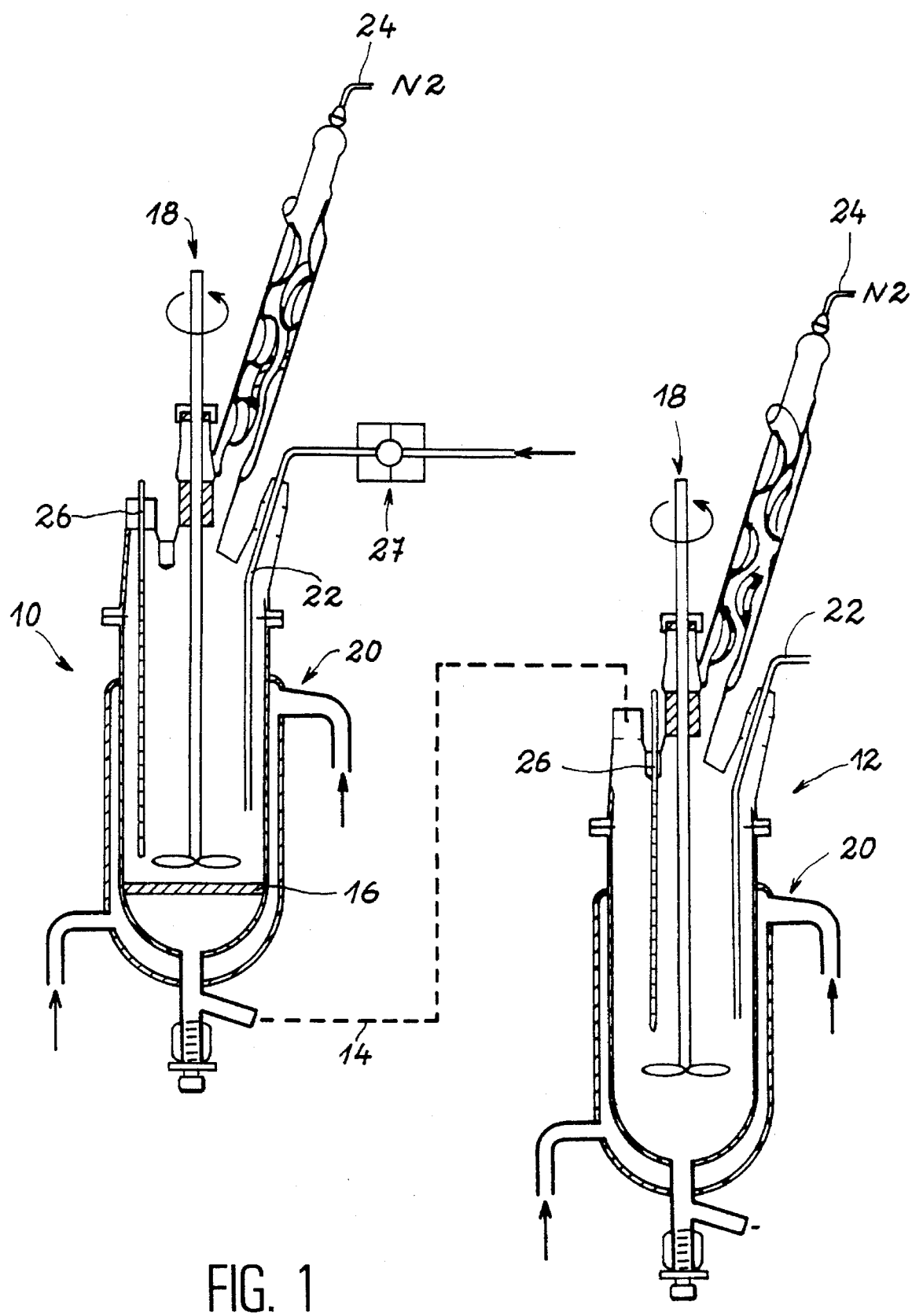

United States Patent [19]
Beziers et al.

[11] Patent Number: 5,532,288
[45] Date of Patent: Jul. 2, 1996

[54] PROCESS FOR THE PREPARATION OF A POLYSILANE CROSSLINKED BY IONIZING RADIATION AND PROCESS FOR THE PRODUCTION OF A COMPOSITE MATERIAL HAVING A POLYSILANE MATRIX

[75] Inventors: Daniel Beziers; Evelyne Chataignier, both of St Nedard En Jalles; Patrick Noireaux, Le Mans, all of France

[73] Assignee: Aerospatiale Societe Nationale Industrille, France

[21] Appl. No.: 412,611

[22] Filed: Mar. 29, 1995

Related U.S. Application Data

[63] Continuation of Ser. No. 89,233, Jul. 8, 1993, abandoned.

[30] Foreign Application Priority Data

Jul. 10, 1992 [FR] France ................................ 92 08584

[51] Int. Cl.$^6$ ........................... C08K 3/04; C08G 77/08; C08F 2/48
[52] U.S. Cl. ..................... 522/71; 522/79; 522/148; 523/207; 428/391; 528/14; 528/25; 528/31; 528/32; 528/12
[58] Field of Search ................... 522/71, 81, 83, 522/148, 99; 523/207; 428/391; 528/14, 25, 31, 32, 12

[56] References Cited

U.S. PATENT DOCUMENTS

| | | | |
|---|---|---|---|
| 4,435,259 | 3/1984 | Chang | 522/99 |
| 4,783,516 | 1/1988 | Schilling, Jr. et al. | 528/14 |
| 4,889,899 | 12/1989 | Bujalski et al. | 525/479 |
| 5,087,685 | 2/1992 | Sartori et al. | 528/25 |

FOREIGN PATENT DOCUMENTS

| | | | |
|---|---|---|---|
| 0280387 | 1/1987 | European Pat. Off. | C08L 83/16 |
| 0337832 | 3/1989 | European Pat. Off. | C04B 35/80 |
| 0444555 | 2/1991 | European Pat. Off. | C08J 5/24 |
| 2458553 | 6/1979 | France | C07F 7/08 |
| 2564029 | 5/1984 | France | B29C 35/08 |
| 2616152 | 6/1987 | France | C08G 77/60 |
| 2620123 | 9/1988 | France | C08G 77/60 |
| 2642080 | 1/1989 | France | C08G 77/60 |
| 2655993 | 12/1989 | France | C08L 83/04 |
| 2664896 | 7/1990 | France | C08G 77/60 |

*Primary Examiner*—Susan W. Berman
*Attorney, Agent, or Firm*—Hayes, Soloway, Hennessey, Grossman & Hage

[57] ABSTRACT

Process for the preparation of a polysilane crosslinked by ioning radiation and process for the production of a composite material having a polysilane matrix. The preparation process consists of subjecting to ionizing radiation chosen from among X-rays and an electron bombardment, a formulation crosslinkable by ionizing radiation incorporating at least one polysilane having at least one vinyl termination.

32 Claims, 2 Drawing Sheets

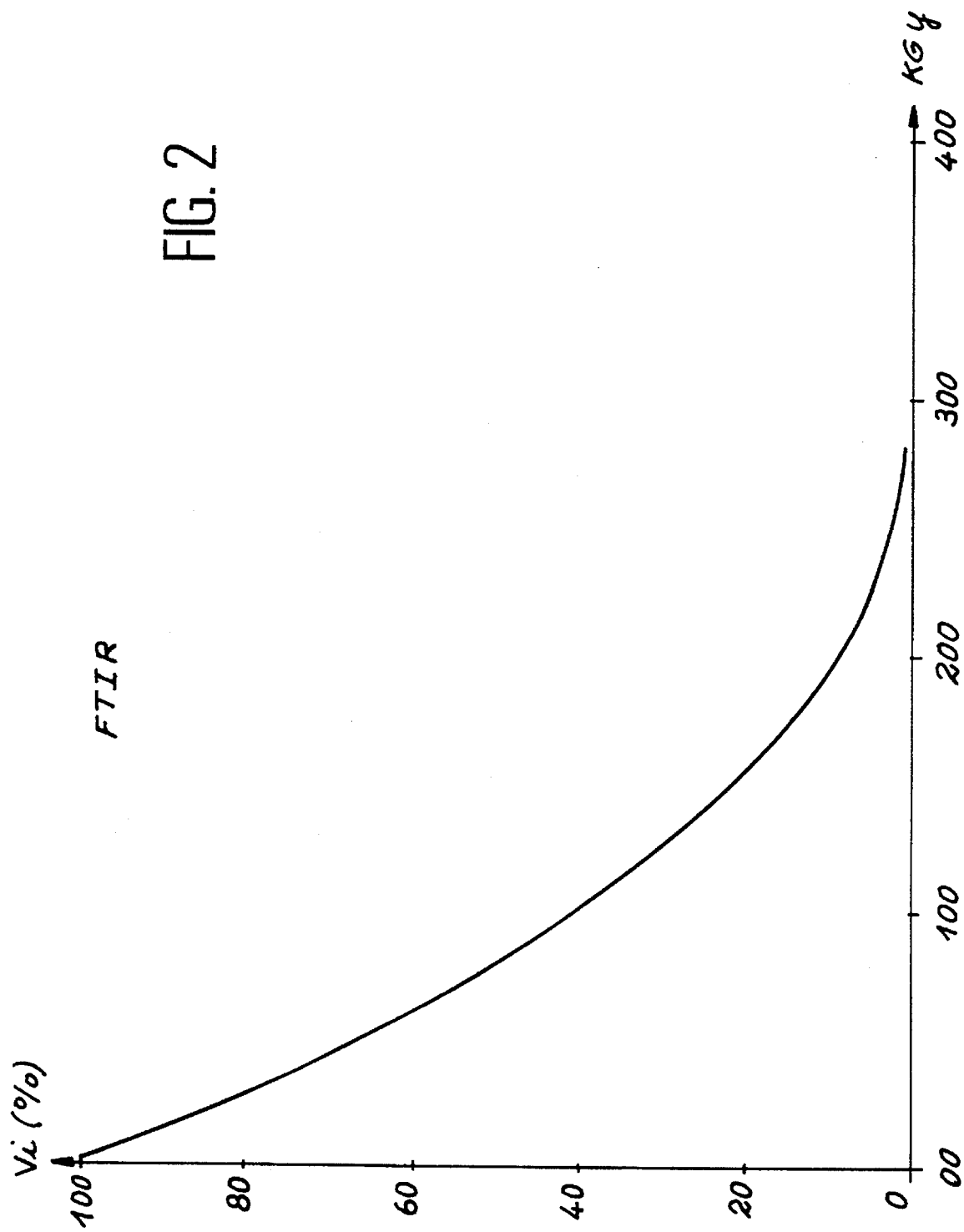

PROCESS FOR THE PREPARATION OF A POLYSILANE CROSSLINKED BY IONIZING RADIATION AND PROCESS FOR THE PRODUCTION OF A COMPOSITE MATERIAL HAVING A POLYSILANE MATRIX

This is a continuation of application Ser. No. 08/089,233 filed on Jul. 8, 1993 now abandoned.

The present invention relates to a process for the preparation of a polysilane crosslinked by ionizing radiation. This process is more particularly usable for the production of composite material parts polymerized and/or crosslinked under ionizing radiation having to resist high temperatures typically exceeding 350° C.

The composite materials to which the invention applies are those constituted by an organic resin and immiscible elements intended to give particular properties thereto. These materials are in particular constituted by a mineral or organic fibrous reinforcement ensuring the strength and rigidity of the parts and an organic matrix ensuring the connection between the reinforcing fibres and the transfer of forces between said fibres. The fibres can be of glass, silica, carbon, alumina or aramide.

These composite materials can be used in numerous industrial fields and in particular in space, aeronautics, cars, shipping and in the field of competitive sports. In general terms, these composite materials can be used for producing lightweight mechanical parts having high mechanical and thermal strength characteristics.

The organic matrixes used at present for the production of these composite materials are thermosetting resins polymerized and/or crosslinked under high pressures and high temperatures requiring the use of an autoclave.

These hot polymerization processes lead to materials having defects due to thermal effects such as internal stresses, microcracks and delaminations. In addition, polymerization takes an extremely long time, which has serious financial consequences from the investment and energy consumption standpoints.

The polymerization processes using radiation such as X, gamma and electrons permit polymerization and/or crosslinking without raising the temperature. Therefore composite materials with a very good quality can be obtained in a relatively short time, whilst using relatively small energy quantities. In addition, these cold polymerization processes are compatible with all fibre types used in the composition of composite materials.

A process for the polymerization and crosslinking of thermosetting resin with an acrylic termination by ionizing radiation used in the production of composite material parts is in particular described in FR-A-2 564 029.

If a thermosetting resin is exposed to a temperature above its glass transition point, said resin definitively loses all its mechanical properties. In addition, thermosetting resins can only be used for temperatures below their glass transition points.

Thermosetting resins polymerizable under ionizing radiation, currently used in composite materials, are epoxy resins having an acrylic termination. However, the known epoxy resins having the best mechanical and thermal performance characteristics have glass transition points of approximately 200° C., so that their use is limited to low temperature applications, especially below 180° C.

FR-A-2 616 152 and FR-A-2 642 080 disclose thermally crosslinkable compositions based on polysilanes, used as such or transformed into silicon carbide by a heat treatment. The polymerization temperatures are 250° to 300° C. These polysilanes are characterized by a main chain formed from a succession of silicon atoms giving particular properties to these polymers.

Thermally crosslinked polysilanes suffer from the disadvantages referred to hereinbefore and which are more particularly associated with this polymerization type. It has also been found that polymerization takes place with a by no means negligible weight loss (approximately 8%) and that it is virtually impossible to produce parts having large dimensions both as regards thickness and length.

In addition, the resins obtained are unstable and in particular oxidizable in the open air, which requires the production of the parts and the curing to take place under an inert atmosphere, said instability being exacerbated by the temperature.

The invention relates to a process for the preparation of a crosslinked polysilane not suffering from the above disadvantages. It in particular permits the production of parts having large dimensions without any special problems.

The invention relates to a novel process for the preparation of crosslinked polysilanes, so that polysilanes having a high mechanical and thermal strength can be obtained and which are usable in applications requiring these properties. These polysilanes are more particularly intended for forming the matrix of a composite material having a high performance fibrous reinforcement.

A first object of the invention relates to a process for the preparation of a crosslinked polysilane, characterized in that a formulation crosslinkable by ionizing radiation incorporating at least one polysilane having at least one vinyl termination is exposed to ionizing radiation chosen from along X-rays and an electron bombardment.

At temperatures not exceeding 100° C. and in a very short time, this process makes it possible to obtain polysilane resins with limited internal stresses and which are free from microcracks. This process takes place without any weight loss, i.e. with a 1% level of materials extractable with toluene reflux and determined on the basis of an ionized material or resin.

In order to adapt the viscosity of the crosslinkable formulations and facilitate their use, it is advantageous to use at least one reactive diluent having a vinyl termination and copolymerizable with the polysilane under X-rays or electron bombardment.

In general terms, said reactive diluent or diluents in each case have a main carbon chain with 1 to 20 carbon atoms and can be used in proportions between 1 to 40 parts by weight for 100 parts by weight of formulation.

As reactive diluents usable in the invention, reference can be made to monomers such as divinyl benzene (DVB) or N-vinyl-2-pyrrolidone (NVP). These diluents can be used alone or in combination and their choice is essentially dependent on the envisaged application. Apart from the adaptation of the viscosity, these diluents reduce the oxidizability of certain polysilane-based formulations.

With a view to reducing said oxidizability, it is also possible to add to the formulation radical inhibitors such as phenols. In particular, it is possible to add ionol or more precisely 2,6-butyl-4-methyl phenol in concentrations of 50 to 300 ppm.

With a view to adapting the mechanical and thermal properties of the crosslinked polysilanes and in particular their glass transition point, it is possible to use other additives which are potentially reactive under X-rays or electron bombardment and having a vinyl termination such as e.g. vinyl silazanes, bismaleimide resins or mixtures thereof.

Silazanes have a structure close to that of polysilanes and as a result of the presence of silicon have a high glass transition point improving that of the crosslinked formulation. They have a formula of type (A):

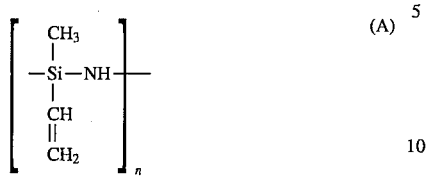

with n between 1 and 5 and e.g. equal to 3 or 4.

The additive quantity used is a function of the desired properties and can range between 1 and 70 parts by weight, for each additive, for 100 parts by weight of polysilane.

The crosslinked polysilane preparation process described hereinbefore is suitable for the production of composite material parts and in particular having a fibrous reinforcement. These parts can be obtained by moulding, filamentary winding, unidirectional or multidirectional draping, preimpregnation, injection, etc.

The invention also relates to a process for the production of a composite material having reinforcing fibres embedded in an organic matrix consisting of impregnating the fibres of a crosslinkable formulation by ionizing radiation containing at least one polysilane having at least one vinyl termination and subjecting the impregnated fibres to ionizing radiation chosen from among X-rays and electron bombardment. The formulations used are the seine as those described hereinbefore.

The polymerization and/or crosslinking of the composite material can be carried out with known means and in particular using the X-ray or electron bombardment polymerization and crosslinking apparatus described in FR-A-2 564 029.

The fibres can be woven, braided or wound and made from glass, silica, carbon, alumina, aramide, etc.

For the production of composite material parts, there are two methods for depositing the organic binder for forming the matrix on the fibres. The first method consists of producing a fibrous preform of the part and then introducing into the latter the binder for forming the matrix. The second method consists of impregnating each binder fibre for forming the matrix and then producing a preform of the part with the impregnated fibres. The invention applies to both these methods for depositing the binder on the fibres.

The irradiation doses used for the polymerization and/or crosslinking of the formulation and those used for the polymerization and crosslinking of a composite material are high being in the range 200 to 500 kGy and preferably 300 to 500 kGy.

These irradiation doses are obtained by passing beneath a particle accelerator the desired formulation at a speed which is inversely proportional to the desired dose and which is dependent on the accelerator characteristics. For an electron accelerator of 10 MeV and a power of 20 kW, in a formulation of part made from a composite material at 40 cm from the accelerator outlet and for a passage speed of 1 m/min, an electron dose of 25 kGy is obtained.

As the necessary doses are obtained at slow speeds and are cumulative, several passages are made at doses of 10 to 50 kGy in each case.

The invention also relates to a process for the production of a polysilane which can polymerize under X-rays or electron bombardment.

According to the invention, the polysilanes are obtained by performing the following stages:

a) reacting in the liquid phase a compound $RoY^1$ in the presence of a melted alkali metal with at least one first monomer having at least one vinyl function of formula (I):

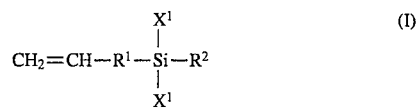

for forming at least one halogenated polysilane with a vinyl function, which is soluble in the liquid phase, $X^1$ and $Y^1$ being the same or different and representing a halogen atom, $R^1$ representing a single covalent bond or a substituted or unsubstituted, saturated or unsaturated hydrocarbon radical, Ro representing an optionally silicon-containing, saturated or unsaturated, hydrocarbon radical and $R^2$ representing a hydrogen atom or a substituted or unsubstituted, saturated or unsaturated, hydrocarbon radical;

b) separating the liquid phase from the solid phases;

c) carrying out a nucleophilic substitution of the halogen atoms of the polysilane dissolved in the liquid phase; and d) extracting the substituted polysilane from the liquid phase.

Stage a) consists of a reducing duplication in the presence of an alkali metal such as sodium, which consists of a polycondensation of the comonomers with the formation of the corresponding alkali metal halides. Sodium is preferred because it favours the formation of linear products and has little or no attacking action on the possible Si—H bonds of the monomers used.

Stage a) is performed in an anhydrous solvent medium, which is inert with respect to the monomers used and which has a boiling point above that of the alkali metal used. In the case of sodium the solvent must have a boiling point equal to or above 100° C.

The solvents used are the same as those described in FR-A-2 616 152 and FR-A-2 642 080. In particular, use is made of toluene and heavy alkanes, i.e. alkanes having at least 8 carbon atoms. An electron donor solvent can optionally be added, such as dioxan or tetrahydrofuran (THF) and other ethers.

Copolymerization takes place in an inert atmosphere of nitrogen or rare gas such as argon at atmospheric pressure and a temperature between 90° and 140° C. as a function of the alkali metal and solvents chosen, thus ensuring the dispersion of said melted alkali metal in the form of small balls in the solvent.

No matter what the choice of the monomers used, the final reaction medium is constituted by two phases, namely a liquid phase containing the solvents and the residual monomers in which is diluted a mixture of soluble polysilanes resulting from the duplication and a solid phase dispersed in the liquid phase mainly containing mineral salts such as alkali metal halides and the unconsumed alkali metal with, as a complement, an insoluble solid polysilane fraction resulting from a parasitic, but very minority reaction, which leads to the necessity of separating these phases (stage b).

Moreover, no matter what monomers are used, it is not possible to avoid the presence of Si-halogen bonds in the soluble polysilanes, as well as other halogen-based units in complex or non-complex ionic form. It is therefore necessary to carry out a nucleophilic substitution of the halogen atoms present on the polysilane (stage c).

In practice, the reducing duplication of halosilane by an alkali metal under the above conditions leads to an excellent consumption of said metal and to a polysilane having a moderate halogen group content.

It can be typically estimated that the halogen atom content is below 30% by weight, the latter being based on the weight of the dry extract from the filtered solution based on the reaction medium. This substitution can be carried out according to the prior art, performing a hydrolysis as described in U.S. Pat. No. 4,783,516.

However, the action of water with respect to halosilane groups constitutes a non-selective and non-limitative action, which can induce a duplication, or cause a crosslinking or gelling and lead to compounds having Si—O—Si—bonds.

According to the invention, it is also preferable to subject the liquid phase containing the polysilanes to the action of specific reagents ensuring a complete substitution of the halogen groups by nucleophilic groups not liable to subsequently react under conventional temperature and atmospheric conditions.

These specific reagents are organometallic and are advantageously organomagnesium (or Grignard reagent) of formula $RMgY^2$ or organolithium RLi, in which R represents a saturated or unsaturated, substituted or unsubstituted, hydrocarbon radical and $Y^2$ represents a halogen atom.

The substitution of the halogens of the polysilanes by organometallic compounds preferably takes place by adding the dissolved halogen derivative to a solution containing the organometallic reagent. However, it is also possible to envisage the reverse reaction.

R advantageously represents a hydrocarbon radical with a vinyl termination or limited size, such as the methyl group. However, it is possible to envisage other radicals, such as ethyl or phenyl groups. The substitution reactions are performed at temperatures between 0° and 100° C. in accordance with the standard protocol for these reagents.

The polysilanes resulting from the treatment by an organomagnesium or organolithium compound have an excellent stability at ambient temperature and are in particular only slightly oxidizable, whilst having a high stability with respect to hydrolysis. There is also an improvement to the thermal properties. In particular, the temperature measured by thermogravimetry (TGA) increases, everything else being equal. The temperature measured by TGA indicates the decomposition temperature of the product.

This treatment by organometallic compounds also makes it possible to avoid the use of radical inhibitors. In particular, these polysilanes can be left for several hours in the ambient air and at temperatures up to 70° C. without suffering any deterioration of an oxidizing nature.

Advantageously, stage a) of the reducing duplication is performed in the presence of a second monomer having at least one Si—H bond of formula $$\begin{array}{c} X^2 \\ | \\ R^3-Si-H \\ | \\ X^2 \end{array} \quad (II)$$

in which $X^2$ is a halogen and $R^3$ a hydrogen atom or a saturated or unsaturated, substituted or unsubstituted, hydrocarbon radical.

The use of Si—H bond monomers improves the polymerization by X-rays or electron bombardment.

Research has demonstrated that the ratio of the Si—CH=$CH_2$/Si—H functions is advantageously between 2 and 3.3.

Preferably, $R^3$ is an unsubstituted, saturated or unsaturated, hydrocarbon radical. Research has also shown that it is preferable to space the Si—H bonds from one another.

In order to space the Si—H bonds, it is possible to carry out stage a) in the presence of a third monomer of formula (III):

$$\begin{array}{c} X^3 \\ | \\ R^4-Si-R^5 \\ | \\ X^3 \end{array} \quad (III)$$

in which $R^4$ and $R^5$, which can be the same or different, represent a hydrogen atom or a saturated or unsaturated, substituted or unsubstituted, hydrocarbon radical.

According to the invention, the halogen atoms $Y^1, Y^2, X^1, X^2$ and $X^3$, which can be the seine or different, can represent a fluorine, chlorine, bromine or iodine atom.

The hydrocarbon radicals according to the invention can have 1 to 20 carbon atoms and when they are not substituted can be of the alkyl, aryl or alkenyl type. These radicals are in particular methyl, ethyl, phenyl, or radicals having a vinyl termination ($CH_2$=CH—) or allyl termination ($CH_2$=CH—($CH_2$)p with p equalling 1 to 6.

When they are substituted, the usable substituents are of the ether or thioether type.

The second monomer with respect to the Si—H bonds, bat also the first and third monomers, if necessary, make it possible to supply additional functions to the polysilane having to be crosslinked, when $R_2$, $R_4$ or $R_5$ represent H by grafting on the Si—H bonds of the monomer, as described in FR-A-2 616 152. These functions are in particular epoxy functions

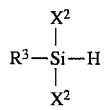

methacrylic or ester functions (R—O—R with R being alkyl, aryl or alkenyl).

In order to optimize the polymerization and crosslinking by X-rays or electron bombardment, it is preferable to use as the compound $RoY^1$, which is a chain end compound/non-silicon-containing compound. In particular, this non-silicon-containing compound is a methyl halide such as $CH_3I$ as a result of the small size of the methyl group.

However, it is possible to use for this chain end reagent compounds in which Ro represents an ethyl or phenyl group. It is also possible to use a silicon-containing material such as trimethyl chlorosilane.

The use of a non-silicon-containing compound such as $CH_3I$ makes it possible to modify the steric environment of the vinyl groups of the first monomer located at the end of the chain. Thus for $R^1$= a single band and $R^2$=—$CH_3$, there is a duplication of type:

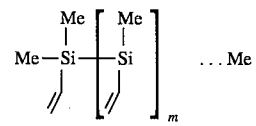

instead of a duplication with $RoY^1$= $Me_3SiCl_2$ of type:

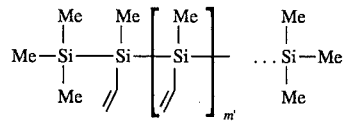

with Me representing the methyl group and m and m' integers from 1 to 20.

The invention is described in greater detail hereinafter relative to non-limitative embodiments and with reference to the attached drawings, wherein show:

FIG. 1 The apparatus making it possible to produce polysilanes crosslinkable by X-rays or electron bombardment.

FIG. 2 Diagrammatically a FTIR analysis or Fourier transform infrared spectrometer illustrating the consumption of vinyl groups of a polysilane as a function of the irradiation dose.

Different polysilane-based formulations were produced with a view to their crosslinking under X-rays or electron bombardment. These formulations were produced according to the following protocol, based on FIG. 1.

The equipment shown in FIG. 1 consists of two thermostatically controlled, e.g. Pyrex rectors 10, 12 linked by a pipe 14. The reducing duplication of the halosilanes is performed in the reactor 10 equipped in its lower part with a sintered disk 16 with a porosity close to 10 µm. There is also an effective stirring system 18, a water circulation cooling system 20 with an adapted capacity and various inlets such as 22, 24 and 26 for respectively the introduction of monomers, inert gas such as nitrogen and the measurement of temperature. Moreover, the inlet 22 is provided with a dosing pump 27 for permitting the introduction of clearly defined quantities of the various monomers to be copolymerized.

The reactor 12 differs from the reactor 10 through the absence of the sintered disk 16. The other elements, which are identical to those of reactor 10, carry the same references. The reactor 12 is used for nucleophilic substitution and then the isolation of the polysilane.

The two reactors are placed under an inert, anhydrous atmosphere and then a toluene solvent-dioxan 50/50 mixture is introduced into the reactor 10, followed by the addition of the desired sodium quantity, namely 1.05 equivalent per atom of halogen.

This is followed by heating to the reflux temperature of the solvents, i.e. between 100° and 110° C. After melting the sodium, effective stirring permits the dispersion of this metal in the form of small balls. The mixture of the different halosilane monomers introduced in a clearly defined quantity into an isolated container is added at 22 at a controlled flow rate into the reactor 10 by means of the dosing pump 27.

The addition flow rate is regulated so as to maintain the reaction mixture at a temperature of 100° to 105° C. Following the end of addition, the reaction mixture is brought to ambient temperature and then passes through the sintered disk 16 under a slight vacuum and into the second reactor 12. The liquid phase transferred into the reactor 12 in particular contains the sought polysilane containing a few halogen atoms which will be substituted in the reactor 12. It then undergoes either hydrolysis, or the action of a Grignard reagent such as methyl magnesium or vinyl bromide, or the action of an organolithium compound The desired quantity of water, Grignard reagent or organolithium compound is added dropwise at 20° C. to the toluene polysilane solution via the pipe 22 of the reactor 12.

The following stages relate to the isolation and washing of the polysilane. The isolation uses the distillation method and washing takes place with water.

A description will now be given of the operating protocol used in the case of a nucleophilic substitution with a Grignard reagent. The latter is used in a 1M solution in tetrahydrofuran (THF) at a concentration of 0.5 to 4 mole/l for 1000 g of crude halogenated polysilane carried by the pipe 14, which is followed by intense precipitation. To complete the reaction, the mixture is heated at the solvent reflux for 2 to 5 hours.

On returning to ambient temperature, a 2N HCl solution names it possible to dissolve the salt formed. After separation by decanting, the organic solution is washed several times with water until a neutral pH of 6 to 8 is obtained. After drying on sodium sulphate, followed by filtration, the solvents are distilled. A stable, low viscosity polysilane is obtained with yields exceeding 80%.

The polysilane then undergoes electron bombardment or X-ray action at doses from 200 to 500 kGy by successive 10 kGy passages under a 10 MeV electron accelerator with a power of 20 kW using a conversion target from X-rays are employed, as described in FR-A-2 564 029.

a) End of chain reagent

EXAMPLES 1 AND 2

Two polysilanes were prepared as described hereinbefore from the vinyl monomer:

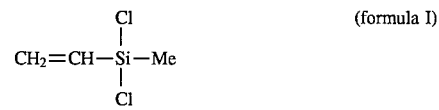

and MeSiHCl$_2$ (formula II), in a ratio of 3 vinyl monomers per hydrogen monomer, in the presence of Me$_3$SiCl or MeI (reagent RoY[1]) at a ratio of 0.4 mole/l for 1 mole/l of the mixture of the two chlorosilanes, Me representing the methyl radical.

The two products obtained underwent hydrolysis according to FR-A-2 642 080, followed by analysis in a controlled, inert atmosphere (nitrogen) with a view to showing the advantages of the use of MeI compared with Me$_3$SiCl. The compared characteristics of these two polysilanes are given in table 1.

These polysilanes are respectively designated PVS1 (Ro=SiMe$_3$) and PVS2 (Ro=Me). They are isolated with yields close to 75% and in steric exclusion chromatographic (CES) analysis and nuclear magnetic resonance of the protons (NMR$^1$H) reveal similar values. However, TGA analysis after crosslinking by electron bombardment (EB) at 400 kGy by successive 10 kGy irradiations reveals two beneficial points due to the use of MeI, namely an improved pyrolytic yield of 69% instead of 62% and a start of pyrolysis at about 500° C. instead of 400° C.

The extractive materials are below 1% after ionization by electron bombardment at a dose of 400 kGy. Extraction takes place in toluene heated to the reflux temperature for 4 hours, followed by Grinding the polysilane obtained. The extractable material percentage represents the percentage of products not crosslinked.

As a result of the use of a non-silicon-containing end of chain monomer, a polysilane is obtained with a Si—CH=CH$_2$ function content of an improved nature and which is therefore better adapted to crosslinking by electron bombardment.

in table 1 $\overline{Mn}$ represents the number average molecular weight.

EXAMPLES a AND b

Table 1a demonstrates the influence of using MeI in place of Me$_3$SiCl on the production of vinyl bonds favourable for polymerization under electron bombardment. Example 1a corresponds to a 72 mole % MeViSiCl$_2$ copolymerization with 28 mole % MeSiCl, in which Vi is CH$_2$=CH— and example 1b to the copolymerization of the same vinyl compound with MeI in the same proportions It can be seen that the quantity of extractable materials decreases after ionization by 400 kGy electrons and is below 1, when use is made of the non-silicon-containing compound for the chain end.

b) Grignard reagent.

EXAMPLES 3 TO 13

Different polysilanes were prepared in the presence of MeI for different dichlorosilane proportions. These products either underwent hydrolysis, or the action of a Grignard reagent. The results are given in table 2.

In the table, $\overline{Mw}$ represents the weight average molecular weight of the polysilane, and $\overline{Mn}$ the number average molecular weight, whilst L represents the product before nucleophilic substitution, LH the product hydrolyzed under the action of the Grignard reagent and Vi and Me are the vinyl and methyl radicals.

The table shows that for polysilanes of type PVS2 and PVSMe2, the initial dispersity values $I=\overline{Mw}/\overline{Mn}$ determined by SEC, between 2 and 5 for the products present in the crude solution, indicated in column L, are maintained on using Grignard reagent quantities exceeding 3 or 4 equivalents for 1000 g of halogenated polysilane.

The inventors have also found that only polysilanes treated by 3 or 4 $RMGY^2$ equivalents are stable without any skin formation on the surface indicating a crosslinking by hydrolysis of the SiCl units when exposed to the ambient atmosphere.

EXAMPLES 14 TO 18

Polysilanes of composition $RoY^1/MeViSiC_2/MeHSiCl_2$ in proportions 28/54/18 underwent either hydrolysis, or the action of the Grignard reagent ViMgBr. These products were then left in the ambient air and Fourier transform infrared spectroscopy (FTIR) was used for following the evolution of the oxidation of the polysilanes according to the final treatment. The results are given in table 3.

Oxidation occurs at the end of about 15 minutes for hydrolyzed compounds, whereas it only occurs after 60 min. for a treatment with ViMgBr at a concentration of $0.5.10^{-3}$ mole/l and a time exceeding 240 min. when using said reagent with a concentration of $3.10^{-3}$ mole/l.

EXAMPLES 19 TO 21

A polysilane having the same composition as in examples 3 to 6 was filtered and obtained with a yield exceeding 80%.

Treatment of said crude solution by MeMgBr (Example 19) on the basis of 3 or 4 equivalents for 1000 g of halogenated polysilane lead, after the usual washing at the end of treatment, to products whose analysis reveals the absence of molecular weight evolution (determined by SEC), but having a stability in air (determined by FTIR), with respect to oxidation or a shorter pot life than that obtained for said same crude solution treated with ViMgBr (example 20). There is a good vinyl group content retention at the end of the time, determined by $NMR^1H$.

The crude solution was treated with butyl lithium (example 21) based on 4 equivalents for 1000 g of polysilane under the same conditions as those used when employing the Grignard reagent.

This treatment leads to a stable product, whose SEC analysis reveals a slight increase in the molecular weight values. It also has a good stability in ambient air. The $NMR^1H$ analysis indicates a reduction in the vinyl content compared with the crude solution.

The results are given in table 4, where the figures appearing in the columns head "oxidation determination" indicate the evolution of the intensity of the C=O band linked with the oxidation compared with that of the Si—H band respectively at 1700 and 2100 $cm^{-1}$.

Thus, in order to modulate the viscosity of the polysilanes, it is possible to expose then to a Grignard reagent mixture and in particular MeMgBr and ViMgBr. The viscosity increases when the MeMgBr quantity increases and when the ViMgBr quantity decreases.

c) Function necessary for crosslinking.

EXAMPLES 22 TO 25 AND COUNTER-EXAMPLE 1

Different polysilanes were prepared from $MeViSCl_2$, $MeHSiCl_2$ and $Me_3SiCl$ under the conditions described hereinbefore and in varying proportions and underwent hydrolysis in accordance with the prior art. The content of the Si—Vi and Si—H functions were determined on the basis of a $NMR^1H$ spectrum before the polysilane underwent electron bombardment (EB) under the conditions described hereinbefore.

Following electron bombardment with an irradiation dose of 400 kGy, the products obtained underwent a toluene reflux extraction for 4 hours. The uncrosslinked extracted material percentages are given in table 5. The latter shows that the vinyl function-free polysilanes are not polymerizable or crosslinkable under electron bombardment (cf. counter-example 1) and this also applies for X-rays.

The polyvinyl silanes (examples 22 to 25) are polymerizable and crosslinkable under electron bombardment. In addition, example 22 associating the vinyl and Si—H functions has the lowest residual, non-polymerizable content.

Moreover, polysilanes obtained from vinyl function-free compounds such as $Me_2SiCl_2$ or $C_6H_5$—O—$(CH_2)_3$—$SiMeCl_2$ are not crosslinkable under electron bombardment or X-rays.

In the case of polyvinyl silanes of types PVS and PVI, the uncrosslinked materials are oligomers of the tetravinyl silane or pentavinyl silane type.

Inert products under electron bombardment can be eliminated from the reaction medium before crosslinking by volatilization.

d) Reactive diluent.

The following examples relate to the use of a reactive diluent such as N-vinyl pyrrolidone with vinyl function polysilanes.

EXAMPLES 26 AND 27

It can in particular be seen that polysilanes obtained by the copolymerization of $Me_3SiCl$ and Me—Si—$(CH=CH_2)Cl$ treated with NVP lead to a better polymerization yield and to a lower extractable material level, which is made apparent in table 6.

The indicated NVP proportion corresponds to parts by weight for 100 parts by weight of polysilane. This table also reveals the nature of the extractable materials after a 400 kGy electron bombardment.

In examples 26 and 27, the polysilane is obtained by copolymerization of 72 mole % $MeViSiCl_2$ and 28 mole % $Me_3SiCl$.

EXAMPLES 28 TO 33

The addition of NVP also improves the properties of the polyvinyl silanes obtained on the basis of a copolymerization of Me$_3$SiCl, MeViSiCl$_2$ and MeHSiCl$_2$. The addition of a radical inhibitor of the ionol type to the said polyvinyl silanes also gives the polysilanes a stability in air without any deterioration of the chemical structure and a good retention of the capacity thereof for crosslinking under electron bombardment. However, there is a significant increase in the extractable material contents.

The results are given in table 7, which also gives the temperature measured by TGA in °C., as well as the EMA corresponding to the glass transition point of the crosslinked polysilanes obtained. Thus, the presence of a stabilizer and also that of a vinyl reactive diluent makes it possible to obtain a high temperature measured by TGA exceeding that of the polysilane alone.

EXAMPLES 34 TO 36

Similar results are obtained by replacing NVP by DVB (cf. table 8). In the latter it is also possible to see the influence of the irradiation dose on the formulation based on the polysilane and the reactive diluent determined by FTIR spectrometry. Thus, the quantity of extractable materials decreases with the irradiation dose. This is confirmed by the FTIR curve of FIG. 2 giving the vinyl bond quantity consumed as a function of the irradiation dose by electrons for a polysilane having a formulation identical to that of example 34. The extractable material quantity also decreases when using NVP instead of DVB.

EXAMPLE 37

A mixture of a polysilane obtained according to the conditions and proportions of example 6 with a silazane of formula (A) with n=4 with 20 parts by weight silazane for 100 parts by weight polysilane, was bombarded by electrons at a dose of 400 kGy. The extractable material content is only 0.4%.

EXAMPLES 38 TO 40

Carbon fibre N.O.L. characterization modules or rings were produced using formulations according to the invention. These NOL rings were obtained by filamentary winding of a 3 mm thick carbon wick constituted by 12000 filaments, impregnated with a formulation resulting from a copolymerization of 28 mole % Me$_3$SiCl, 54 mole % MeViSiCl$_2$ and 18 mole % MeSiHCl$_2$.

The fibres used were intermediate module carbon fibres (IM) either having a specific lubrication/oiling (ES) of the acrylate type for examples 38 and 39, or a commercial lubrication or oiling (G) of the epoxy type for the fibres of example 40. The specific oiling of fibres is in particular that described in FR-A-2 646 431. The impregnation temperature necessary for producing the composite is 35° C.

These NOL rings were irradiated by electron bombardment at a dose of 400 kGy in forty 10 kGy passages. The shear characteristics of these NOL rings were measured at ambient temperature Ta and the results are given in table 9. This table shows the standard deviation σ of the shear measurements, as well as the resin content of the NOL rings.

The shear values obtained for resins having a high Tg are excellent, bearing in mind the specificity of the mechanical properties.

No problems are caused when using polysilane-based resins and this leads to composite materials having good interface properties and high thermal performance characteristics.

Other polysilane-based composite material parts such as interstage ferrules for rocket launchers obtained by filamentary winding can be envisaged.

It is also possible to consider using other production methods, such as e.g. draping or injection. Thus, certain of the formulations described hereinbefore are sufficiently fluid to permit their injection into a carbon fibre substrate more particularly obtained after weaving.

TABLE 1

| | | POLYSILANE PVS: evolution of characteristics (RoY[1])/MeViSiCl$_2$/MeHSiCl$_2$: 28/55/17) | | | | | |
|---|---|---|---|---|---|---|---|
| | | BEFORE EB | | | AFTER EB | | |
| Ex. No. | polysilane type | (1) Mn̄ | I | % (2) —CH=CH$_2$ | °C.; 5% TGA (3) | pyrolysis TGA (4) | extr. mat. % |
| 1 | PVSI (—SiMe$_3$) | 750 | 5 | 19 | 400 | 62% | <1 |
| 2 | PVS2 (Me) | 780 | 12.5 | 23 | 500 | 69% | <1 |

(1) determined by SEC
(2) determined by NMR$^1$H
(3) temperature at which the product has a 5% loss
(4) pyrolytic yield at 900° C.

TABLE 1a

| | | VINYL POLYSILANES PVi2 and PVS2 | | | | |
|---|---|---|---|---|---|---|
| | | | | | AFTER EB | |
| | | BEFORE EB | | | Extr. | TGA |
| Ex. | Name | Mn̄ | I | % —CH=CH$_2$ | mat. % | (°C., 5%) |
| a | PVi1 Me$_3$Si— | 800 | 5 | 19 | 15–17 | — |
| b | PVi2 Me - | 620 | 7 | 23 | <1 | 450° C. |

TABLE 2

EVOLUTION OF DISPERSITY INDEX Mw/Mn ACCORDING TO THE NATURE OF THE FINAL TREATMENT OF THE POLYSILANES

| Ex. | poly-silane type | MeViSiCl$_2$ | MeHSiCl$_2$ | Me$_2$SiCl$_2$ | MeI | \multicolumn{5}{c}{I = Mw/Mn} |
|---|---|---|---|---|---|---|---|---|---|---|
| | | | | | | L | LH | 0.5 | ViMgBr* 2 | 3 |
| 3 to 6 | PVS2 | 54 | 18 | — | 28 | 5 | 12–63 | 12 | 6–7 | 5.3 |
| 7 to 9 | PVI$_2$ | 72 | — | — | 28 | 10 | 17–70 | 8 | 6–7 | — |
| 10 to 11 | PMeVi$_2$ | 36 | — | 36 | 28 | 2 | 3.5 | — | 2.4 | — |
| 12 to 13 | PVSMe$_2$ | 41 | 10 | 20 | 28 | 2 | 11 | — | — | 4 |

*× 10$^{-3}$ mole/l

TABLE 3

DETERMINATION BY FTIR OF THE OXIDATION OF THE POLYSILANES PVS ACCORDING TO THE FINAL TREATMENT

RoY$^1$/MeViSiCl$_2$/MeHSiCl$_2$: 28/54/18

| Ex. | End of chain compound % | | Oxidation time (min) | | | |
|---|---|---|---|---|---|---|
| | Me$_3$SiCl | MeI | L | LH | ViMgBr × 10$^{-3m}$ mole/l 0.5 | 3 |
| 14 to 16 | 28 | — | 15 | 15 | 60 | >240 |
| 17 and 18 | — | 28 | 15 | 15 | — | >240 |

TABLE 6

| Ex. | BEFORE EB | | AFTER EB | |
|---|---|---|---|---|
| | Polysilane type | NVP % | Extr. mat. % | Type |
| 26 | PVi1 | 0 | 8 | oligosilane Si—CH=CH$_2$ |
| 27 | PVi1 | 3 | 6.5 | ditto + traces NVP |

TABLE 4

POLYSILANE PVS2 PREPARED FROM MeI, MeViSiCl$_2$ and MeHSiCl$_2$: (28/54/18)

| Ex. | Grignard reagent | Mw | Mn | I | CH=CH$_2$ | \multicolumn{4}{c}{oxidation determination (h)} | pot stability |
|---|---|---|---|---|---|---|---|---|---|---|
| | | | | | | 0 | 1 | 4 | 24 | |
| 19 | MeMgBr | 4400 | 840 | 5.2 | 20 | 0 | 0.1 | 0.4 | 0.7 | low |
| 20 | ViMgBr | 4100 | 700 | 5.8 | 21 | 0 | 0 | 0 | 0.4 | yes |
| 21 | BuLi | 8000 | 1000 | 8 | 6 | 0 | 0 | 0 | 0.5 | yes |

TABLE 5

DEFINITION OF FUNCTIONS

| EX.* | Polysilane type | MeViSiCl$_2$ | MeHSiCl$_2$ | Me$_2$SiCl$_2$ | Mn | BEFORE EB Function content (%) | | AFTER EB 400 kGy extr. mat. % |
|---|---|---|---|---|---|---|---|---|
| | | | | | | Si-Vi | SiH | |
| 22 | PVS1 | 54 | 18 | — | 750 | 30–35 | 10–15 | <1 |
| 23 | PVi1 | 72 | — | — | 800 | 39 | 0 | 16 |
| 24 | PMeVi1 | 42 | — | 21 | 800 | 28 | 0 | 11.5 |
| 25 | PMeVi1 | 36 | — | 36 | 1000 | 20 | 0 | 5 |
| C-Ex. | PS1 | — | 72 | — | — | 0 | 80 | 100 |

*In the presence of Me$_3$SiCl at a quantity for forming 100%.

TABLE 7

POLYSILANE PVS (M₃SiCl/MeSiViCl₂/MeSiHCl₂)
Interest of a stabilizer (28/54/18)

| | BEFORE EB | | AFTER EB | | |
|---|---|---|---|---|---|
| Ex. | Ionol ppm | NVP | AIR* | Extr. Mat.** % 400 kGy | TGA °C. | DMA °C |
| 28 | 0 | 0 | − | <1 | — | 330 |
| 29 | 50 | 0 | + | 3 | — | |
| 30 | 100 | 0 | + | 4.5 | | |
| 31 | 200 | 0 | + | 4.5–9 | 390 | 320 |
| 32 | 0 | 10 to 40 | − | <2–3 | 402 | 330 |
| 33 | 200 | 20 | + | 5.4 | 365 | 320 |

*Atmosphere during ionization
**After EB at 40 mrad.

TABLE 8

OPTIMIZATION OF THE DOSE - USING DVB OR NVP

| | PARTS BY WEIGHT | | EXTR. MAT. % ACCORDING TO DOSE | | | |
|---|---|---|---|---|---|---|
| Ex. | PVS1 | DILUENT | 200 kGy | 300 kGy | 400 kGy | 500 kGy |
| 34 | 100 | — | 6.9 | 2.4 | 1.5 | 0.8 |
| 35 | 100 | DVB 20 | 69 | 42 | 19 | 11 |
| 36 | 100 | NVP 20 | 5 | 1.4 | 1 | 0.9 |

TABLE 9

NOL RING

| | NOL No. | | |
|---|---|---|---|
| | 38 | 39 | 40 |
| Fibre type | IM7 (ES) | IM7 (ES) | IM7 (G) |
| wt. % resin | 30.4 | 31.7 | 32.2 |
| Shear Ta° (MPa) | 40 σ = 4.8 | 43 σ = 1.3 | 36 σ = 5.6 |

We claim:

1. Process for the preparation of a crosslinked polysilane, characterized in that a formulation crosslinkable by ionizing radiation incorporating at least one polysilane having at least one vinyl termination is subject to ionizing radiation chosen from among X-rays and electron bombardment and is obtained by carrying out the following stages:

a) reacting in an inert anhydrous organic solvent a compound RoY¹ in the presence of a melted alkali metal with at least one first monomer having at least one vinyl function of formula (I):

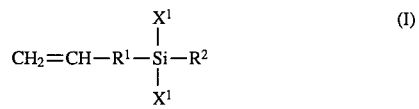

$$CH_2=CH-R^1-\underset{\underset{X^1}{|}}{\overset{\overset{X^1}{|}}{Si}}-R^2 \quad (I)$$

for forming at least one halogenated polysilane with a vinyl function, which is soluble in the liquid phase, X¹ and Y¹ being the same or different and representing a halogen atom, R¹ is a divalent group representing a single covalent bond or a substituted or unsubstituted, saturated or unsaturated hydrocarbon radical, Ro representing a methyl group and R representing a hydrogen atom or a substituted or unsubstituted, saturated or unsaturated, hydrocarbon radical characterized in that the substituents on substituted R¹ and R² are ether or thioether substituents;

b) separating the liquid phase from the solid phases;

c) carrying out a nucleophilic substitution of the halogen atoms of the polysilane dissolved in a solution containing an organometallic compound; and d) extracting the substituted polysilane from the liquid phase.

2. Process according to claim 1, characterized in that the formulation also contains at least one reactive diluent having a vinyl termination copolymerizable under ionizing radiation with the polysilane.

3. Process according to claim 2, characterized in that the reactive diluent is N-vinyl pyrrolidone.

4. Process according to claim 1, characterized in that the formulation contains at least one radical inhibitor.

5. Process according to claim 1, characterized in that the formulation contains at least one silazane having a vinyl termination.

6. Process for the production of a composite material incorporating reinforcing fibres embedded in an organic matrix, consisting of impregnating the fibres with a formulation crosslinkable by ionizing radiation containing at least one polysilane having at least one vinyl termination and subjecting the impregnated fibres to an ionizing radiation chosen from among X-rays and an electron bombardment, the polysilane of the formulation being obtained by performing the following stages:

(a) reacting in an inert anhydrous organic solvent a compound RoY¹ in the presence of a melted alkali metal with at least one first monomer having at least one vinyl function of formula (I):

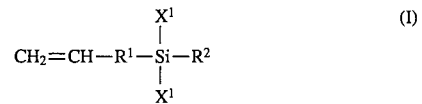

$$CH_2=CH-R^1-\underset{\underset{X^1}{|}}{\overset{\overset{X^1}{|}}{Si}}-R^2 \quad (I)$$

for forming at least one halogenated polysilane with a vinyl function, which is soluble in the liquid phase, X¹ and Y¹ being the same or different and representing a halogen atom, R¹ is a divalent group, representing a single covalent bond or a substituted or unsubstituted, saturated or unsaturated hydrocarbon radical, Ro representing a methyl group and R² representing a hydrogen atom or a substituted or unsubstituted, saturated or unsaturated, hydrocarbon radical characterized in that the substituents on substituted R¹ and R² are ether or thioether substituent;

(b) Separating the liquid phase from the solid phases;

(c) carrying out a nucleophilic substitution of the halogen atoms of the polysilane dissolved in a solution containing an organometallic compound; and (d) extracting the substituted polysilane from the liquid phase.

7. Process according to claim 6, characterized in that the formulation also contains at least one reactive diluent having a vinyl termination copolymerizable under ionizing radiation with the polysilane.

8. Process according to claim 7, characterized in that the reactive diluent is N-vinyl pyrrolidone.

9. Process according to claim 6, characterized in that the formulation contains at least one radical inhibitor.

10. Process according to claim 6, characterized in that the formulation contains at least one silazane having a vinyl termination.

11. Process according to claim 6, characterized in that the nucleophilic substitution is obtained with an organomagnesium compound RMgY² or an organolithium compound RLi, in which R represents a saturated or unsaturated, substituted or unsubstituted, hydrocarbon radical and $Y^2$ represents a halogen atom.

12. Process according to claim 11, characterized in that R represents a hydrocarbon radical having a vinyl termination.

13. Process according to claim 6, characterized in that $RoY^1$ is $CH_3I$.

14. Process according to claim 6, characterized in that stage (a) is performed in the presence of a second monomer having at least one Si—H bond of formula (II):

in which $X^2$ is a halogen and $R^3$ a hydrogen atom or a saturated or unsaturated, substituted or unsubstituted, hydrocarbon radical characterized in that the substituents on substituted $R^3$ are ether or thioether substituent.

15. Process according to claim 14, characterized in that the ratio of the functions SiVi/Si—H, in which Vi represents $CH{=}CH-R^1-$ is chosen between 2 and 3.3.

16. Process according to claim 14, characterized in that stage a) is performed in the presence of a third monomer of formula (III):

in which $R^4$ and $R^5$, which can be the same or different, represent a hydrogen atom, or a substituted or unsubstituted, saturated or unsaturated, hydrocarbon radical characterized in that the substituents on substituted $R^4$ and $R^5$ are ether or thioether substituent.

17. Process according to claim 16, characterized in that the third monomer has at least one function chosen from among the epoxy, acrylic or ester functions.

18. Process according to claim 6, characterized in that the fibres are carbon fibres.

19. Process according to claim 6, characterized in that $R^3$ is an unsubstituted hydrocarbon radical.

20. Process for the preparation of a polysilane crosslinkable under X-rays or electron bombardment, incorporating the following stages:

a) reacting in an inert anhydrous organic solvent a compound $RoY^1$ in the presence of a melted alkali metal with at least one first monomer having at least one vinyl function of formula (I):

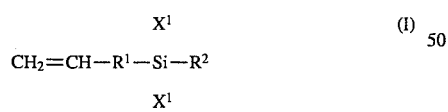

for forming at least one halogenated polysilane with a vinyl function, which is soluble in the liquid phase, $X^1$ and $Y^1$ being the same or different and representing a halogen atom, $R^1$ is a divalent group representing a single covalent bond or a substituted or unsubstituted, saturated or unsaturated hydrocarbon radical, Ro representing a methyl group and $R^2$ representing a hydrogen atom or a substituted or unsubstituted, saturated or unsaturated, hydrocarbon radical characterized in that the substituents on substituted $R^1$ and $R^2$ are ether or thioether substituents;

b) separating the liquid phase from the solid phases;

c) carrying out a nucleophilic substitution of the halogen atoms of the polysilane dissolved in a solution containing an organometallic compound; and d) extracting the substituted polysilane from the liquid phase.

21. Process according to claim 20, characterized in that the nucleophilic substitution is carried out with an organomagnesium compound g or an $RMgY^2$ organolithium compound RLi, in which R represents a saturated or unsaturated, substituted or unsubstituted, hydrocarbon radical and $Y^2$ represents a halogen atom.

22. Process according to claim 21, characterized in that $RoY^1$ is $CH_3I$.

23. Process according to claim 21, characterized in that R represents a hydrocarbon radical with a vinyl termination.

24. Process according to claim 23, characterized in that $RoY^1$ is $CH_3I$.

25. Process according to claim 20, characterized in that $RoY^1$ is a methyl halide.

26. Process according to claim 25, characterized in that $RoY^1$ is $CH_3I$.

27. Process according to claim 20, characterized in that $RoY^1$ is $CH_3I$.

28. Process according to claim 20, characterized in that stage (a) is performed in the presence of a second monomer having at least one Si—H bond of formula (II):

in which $X^2$ is a halogen and $R^3$ a hydrogen atom or a saturated or unsaturated, substituted or unsubstituted, hydrocarbon radical characterized in that the substituents on substituted $R^3$ are ether or thioether substituents.

29. Process according to claim 28, characterized in that $R^3$ is an unsubstituted hydrocarbon radical.

30. Process according to claim 20, characterized in that the ratio of the SiVi/Si—H functions, in which Vi represents $CH_2{=}CH-R^1-$, is chosen between 2 and 3.3.

31. Process according to claim 20, characterized in that stage (a) is performed in the presence of a third monomer of formula (III):

in which $R^4$ and $R^5$, which can be seine or different, represent a hydrogen atom or a saturated or unsaturated, substituted or unsubstituted, hydrocarbon radical characterized in that the substituents on substituted $R^4$ are ether or thioether substituents.

32. Process according to claim 31, characterized in that the third monomer has at least one ester function.

* * * * *

UNITED STATES PATENT AND TRADEMARK OFFICE
CERTIFICATE OF CORRECTION

PATENT NO. : 5,532,288
DATED      : July 2, 1996
INVENTOR(S) : Daniel Beziers, Evelyne Chataignier and Patrick Noireaux It is certified that error appears in the above-indentified patent and that said Letters Patent is hereby corrected as shown below:

Claim 1, Col. 15, Line 63, "R" should be --$R^2$--.
Claim 1, Col. 15, Line 64, after "representing" insert --a methyl group--.

Claim 21, Col. 18, Line 11, delete "g or an".
Claim 21, Col. 18, Line 11, insert --or an-- after "$RMgY^2$".
Claim 31, Col. 18, Line 53, "seine" should be --same--.

Signed and Sealed this

Third Day of December, 1996

Attest:

BRUCE LEHMAN

*Attesting Officer*   *Commissioner of Patents and Trademarks*